INVENTOR.
GEORGE W. MISSON
BY
Oscar L. Spencer
ATTORNEY

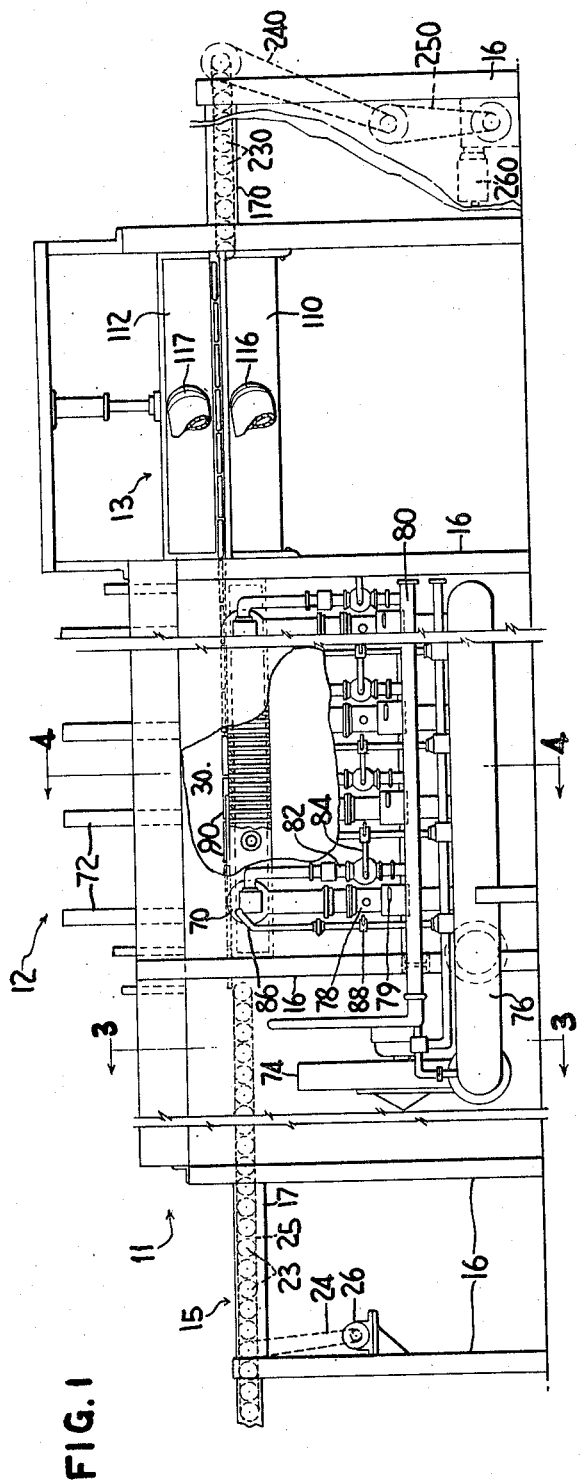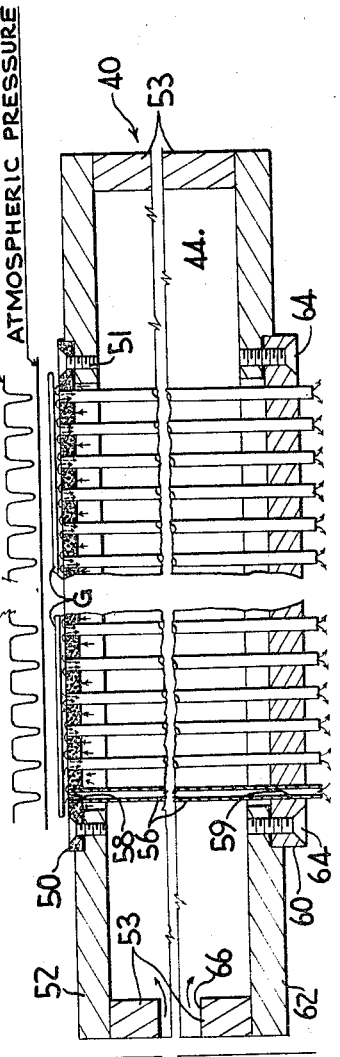

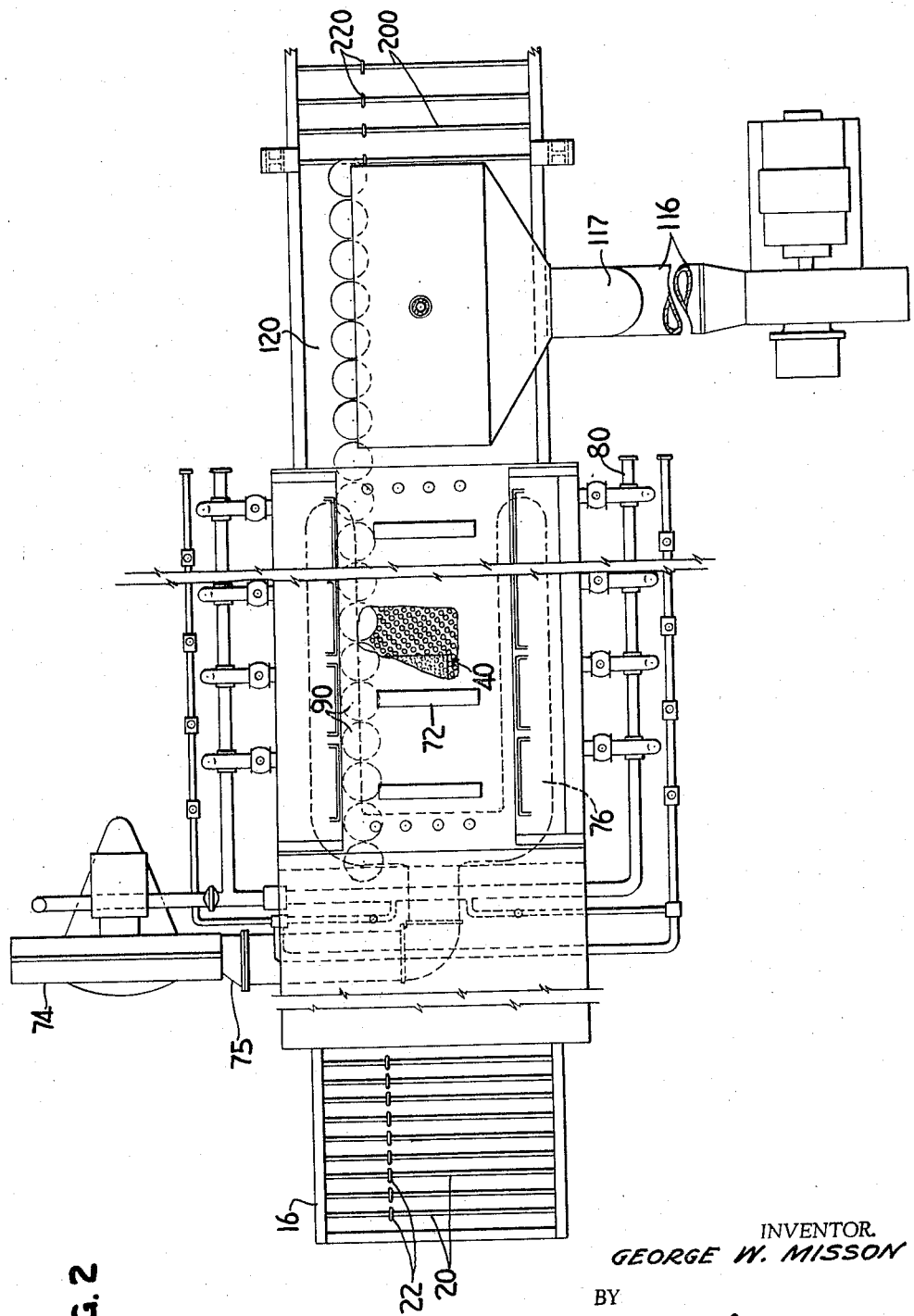

Jan. 24, 1967 G. W. MISSON 3,300,290
METHOD AND APPARATUS FOR CONVEYING AND HEATING
GLASS ON A FLUID SUPPORT BED
Filed Jan. 16, 1963 4 Sheets-Sheet 4

INVENTOR.
GEORGE W. MISSON
BY
Oscar L. Spencer
ATTORNEY

United States Patent Office 3,300,290
Patented Jan. 24, 1967

3,300,290
METHOD AND APPARATUS FOR CONVEYING AND HEATING GLASS ON A FLUID SUPPORT BED
George W. Misson, Pittsburgh, Pa., assignor to Pittsburgh Plate Glass Company, Pittsburgh, Pa., a corporation of Pennsylvania
Filed Jan. 16, 1963, Ser. No. 251,850
6 Claims. (Cl. 65—25)

This invention is a modification of the inventions claimed and/or disclosed in the following U.S. patent applications of James C. Fredley and George E. Sleighter: applications Serial Nos. 31,572 filed May 25, 1960 (now abandoned); 139,901, 139,902 and 140,135 all filed September 22, 1961; 172,235 filed February 9, 1962; 175,938 and 176,050 both filed February 27, 1962; 178,997 filed March 12, 1962; 185,448 filed April 5, 1962; 185,757 filed April 6, 1962; 195,773 filed May 18, 1962; 209,456 filed July 12, 1962 (now abandoned); 236,103 filed November 7, 1962 (now abandoned); and 236,676 filed November 9, 1962 now U.S. 3,223,501.

This invention relates to a support system adapted for handling hot glass or other heat deformable material in sheet or ribbon form without marring or otherwise producing uncontrolled deformation in the major surfaces, even when the glass or other material is at or above a deformation temperature.

In the fabrication of glass through known manufacturing techniques of bending, tempering, annealing or coating and combinations of such techniques to form end-products having characteristics and uses different from the original product, it is necessary to heat the glass sheets to a temperature above that at which the major surfaces or the contour thereof will be changed by a deforming stress or contact with solids.

Economic utilization of fabricating equipment requires that the glass sheets undergoing treatment be conveyed while hot. The necessity of conveying glass at high temperature has herretofore resulted in undesirable deformation or marring of the major surfaces of glass sheets being treated due to physical contact with supporting and conveying apparatus while the glass is at elevated temperatures. The instant invention overcomes this defect common to the known methods of treating glass sheets.

Included in the instant invention are new and useful methods and apparatus for supporting hot glass. More specifically, methods and apparatus have been devised for supporting a sheet or ribbon of glass on a film of gas while the glass is at or above a temperature at which it will deform. For most plate and window glass, this temperature is around 980 degrees Fahrenheit and above. Actual deformation is, of course, dependent upon time and external forces as well as temperature. The film of gas uniformly supports the glass against undesired deformation and eliminates the necessity of contact of the major surfaces of the glass sheet with any solid object while the glass is subject to deformation or impairment. In this manner, the marring or distorting now associated with current flat glass fabricating processes has been eliminated.

In accordance with an embodiment of the invention, there is provided a continuous zone of uniform fluid pressure on the lower side of the glass adequate to support the element undergoing treatment. Gas flows from a reservoir under higher pressure into such zone, being throttled by a porous material which forms a cover to the reservoir to diffuse and restrict the passage of gas between the reservoir and the continuous zone. Unrestricted passageways, large with respect to the pores of the material, open through the porous cover and communicate between the pressure zone and the ambient atmosphere. In operation, the rate of flow of gas from the reservoir through the porous material to the zone beneath the supported glass is maintained at such a level that the glass sheet ribbon is supported in spaced relationship to the porous support bed.

Where separate glass sheets are processed, the supporting apparatus providing the continuous zone of uniform support pressure may be tilted sidewise of the path of travel and the sheets conveyed by rotating drive discs in frictional contact with a lower edge of the sheets. Where a continuous ribbon of glass is processed, e.g., as it is formed, the supporting apparatus is preferably disposed horizontally and the ribbon conveyed from a point beyond the hot processing area as, for example, by subsequent conveying rolls.

The present gaseous support system is particularly suitable to a process in which glass is introduced onto the support area at a temperature below that at which its major surfaces will mar on physical contact with solid objects, is then heated above deformation temperature while being supported primarily by gas and is thereafter cooled until below deformation temperature before being removed from the gas support. Where glass sheets are being treated, the cooling may be sufficiently rapid to temper and hence strengthen the sheets. The system is particularly well adapted for treating flat glass in the form of sheets or the like in which the thickness ranges up to .050 to 1 inch or more and the length and breadth of the sheet generally are several inches to as much as 5 or 10 feet or greater. Optionally, the glass may be bent by conveying it over a curved support bed while the glass is at a deformation temperature.

Advantageously, heating of glass upon the gas support is accomplished by burning a controlled admixture of gas and air, introducing the hot products of combustion to the reservoir or plenum chamber which supplies the supporting pressure, and supplementing the heat thus supplied to the glass by radiant heat from independently controlled source or sources which are generally disposed on the side of the glass opposite the supported side. Similarly, cooling of the glass may be advantageously accomplished by supplying ambient air to the plenum chambers supplying the supporting pressure in a quenching zone and balancing this with ambient air impinged upon the glass from above.

The attendant advantages of this invention will be readily appreciated as the same become better understood from the following detailed description and the accompanying drawings depicting preferred embodiments and in which:

FIG. 1 is a side, elevational view of a system for conveying, heating and quenching sheets of glass;

FIG. 2 is a plane view of the system of FIG. 1;

FIG. 5 is a schematic view of the support unit, as shown in FIG. 4, including a diagrammatic graph;

Figure 3:
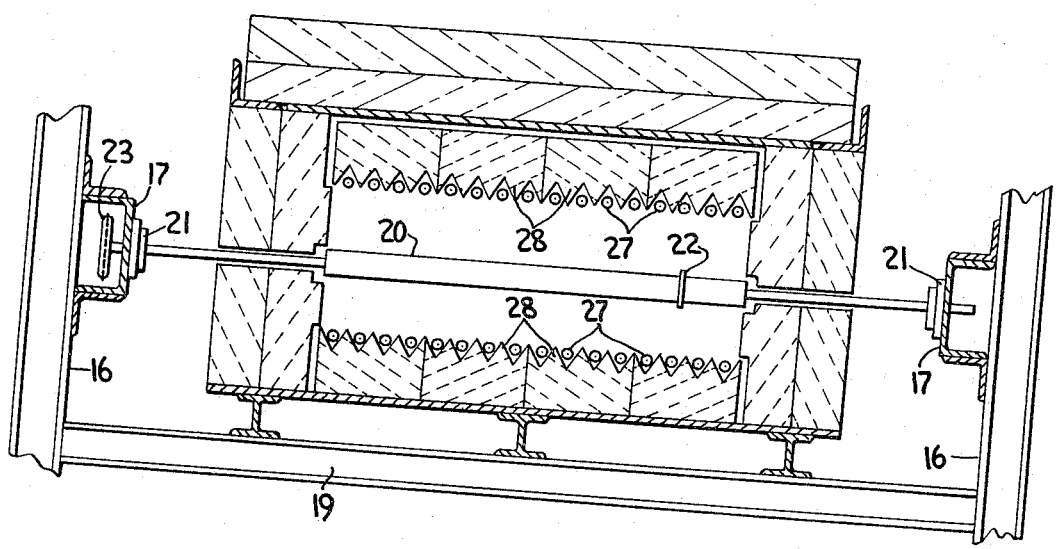
FIG. 3 is a detailed view in section taken along the line 3—3 of FIG. 1.
Figure 4:
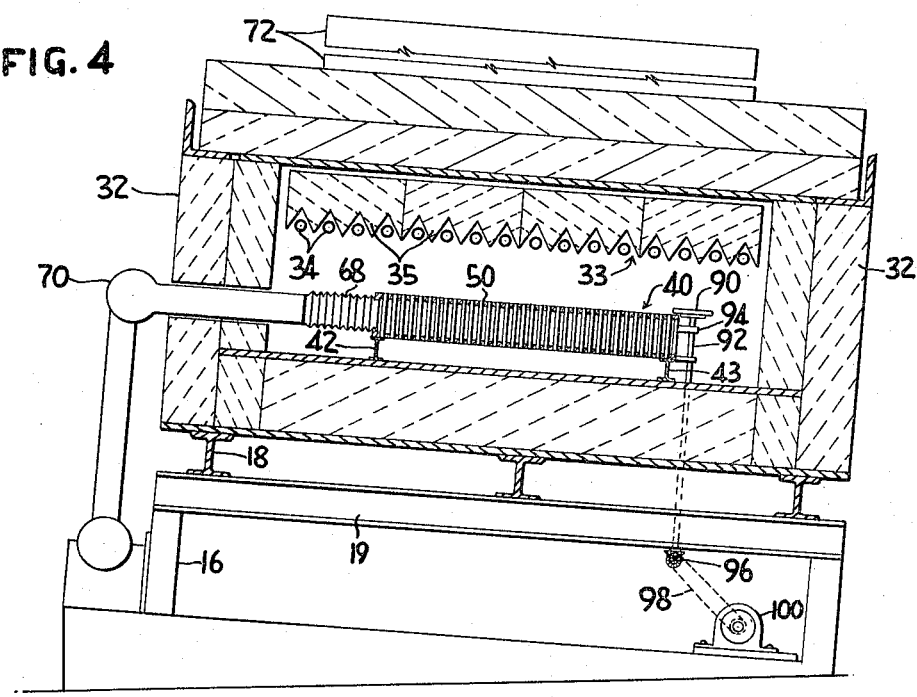
FIG. 4 is a detailed view in section taken along the line 4—4 of FIG. 1.

Referring to the drawings, FIGS. 1–3 illustrate a system advantageously employed for heating flat glass parts up to or above the deformation temperature, e.g., to a temperature at which the glass can be tempered or at which a coating thereon will be heat-cured, quenching such parts while hot and delivering the parts thus tempered or heat-cured onto a roller conveyor for removal. The component sections making up the complete system consist of a preheat section 11 wherein the glass is conveyed on rollers between radiant heaters to preheat the glass until brought to a suitable preheat temperature under the deformation temperature; a gas film support heating section 12 where the glass parts are transferred to and supported on a film of hot gas while being conveyed through a frictional drive contacting the edges only of such parts, heat being supplied by the supporting gas and radiant heat sources above the glass until the glass reaches a temperature high enough for further processing; a quenching section 13 where the glass is rapidly chilled while suspended between opposed flowing films of cool air, edge contact driving being continued through the section; and a delivery section 14 which receives the processed parts and conveys them to their next destination. Associated with the preheat section 11 is an apron roll unit 15 for loading. The essential framework of the apparatus consists of stanchions 16, channel members 17 and 170, girders 18, and cross beams 19. The framework is constructed to provide a common plane of support for the glass which is tilted in a sidewise direction at an angle of five degrees with respect to the horizon, as shown in FIGS. 3 and 4.

As illustrated in FIGS. 1–3, a plurality of conveyor rolls 20 of preheat section 11 are suitably journaled at each end in bearings 21 mounted on the parallel channels 17. The rolls are tilted transversely of the path of travel and are provided with guide collars 22 to position the glass properly for transfer to the heating section. Rolls 20 are driven by attached sprockets 23 through chains 24 and 25 by electric motor 26. Included in the preheat section are a radiant floor and a radiant roof consisting of heating coils 27 disposed in ceramic holders 28. Control is afforded so that the radiant floor and roof may be regulated as to temperature across the path of travel and longitudinally thereof. Thermocouples (not shown) sense the temperature of the preheat section and the glass to actuate the heating coils to the extent necessary to supply the required amount of heat.

Heating section 12 (FIGS. 1, 2 and 4) includes within the supporting framework, previously mentioned, a furnace chamber 30 of insulating refractory walls 32 and a radiant roof 33 with heating coils 34 in ceramic holders 35.

Within furnace chamber 30, a plurality of similar contiguous gas film support units 40 are supported on a pair of horizontal, longitudinally extending I-beams 42 and 43. Units 40 are each comprised of a rectangularly-shaped plenum chamber 44 formed generally of four sidewalls, a bottom wall and a porous top, all of suitable heat-resistant material such as stainless steel, other corrosion resistant metals, or other refractory materials such as silicon carbide or aluminum oxide. Because the entire furnace is tilted, the porous plate forming the top of each plenum chamber 44 is at a sidewise angle to the path of glass travel to facilitate conveying the sheets in a manner yet to be described.

As is shown in more detail in FIG. 5 of the drawings, the major portion of the top of each plenum chamber 44 is formed of a heat-resistant porous plate 50, such as a porous stainless steel plate made of sintered stainless steel particles. The porous plate 50 is fastened about its periphery by machine screws 51 to a top supporting frame 52 attached to the four sidewalls 53. A plurality of thin-walled tubes 56 of suitable heat-resistant material are located within holes 58 in plate 50, flush with the upper surface thereof, and extend downwardly through plenum chamber 44 and through corresponding holes 59 in a bottom plate 60. Plate 60 forms the major portion of the bottom of plenum chamber 44 and is attached to a supporting frame 62 by machine screws 64. With this construction, tubes 56 provide a plurality of conduits communicating between a zone immediately above plate 50 and the ambient atmosphere surrounding the supporting units 40. The zone immediately above plate 50 is supplied gas under pressure through the small openings or pores of the plate and, when covered by a sheet or ribbon of glass, supports the glass in spaced relationship to the plate. Tubes 56 provide an exhaust path for the escape of the continuous flow of supporting gas.

Heated gas under pressure is supplied to each plenum chamber 44 through apertures 66 in one side thereof. Flexible conduits 68 connect apertures 66 with a source of heated gas, such as gas burners 70. Each burner 70 is of the so-called excess air burner type.

To supply air under pressure to the hot gas support combustion system, a blower 74 is employed to feed air under pressure through a conduit 75 to a manifold 76. As best shown in FIG. 1, the individual burners 70 are supplied with air from manifold 76 through conduits 78, each provided with a valve 79.

Combustible gas from a main 80 is introduced into each burner 70 by a conduit 82, each individually valved as at 84. Combustible gas is mixed with an excess of air within each burner and is ignited by a pilot burner supplied with a premixed supply of combustible through a conduit 86 valved as at 88.

The combustion of the products in the combustion chamber of the burner supplies the plenum chamber 44 with heated gas at a uniform temperature and pressure. Adequate control of pressure and temperature is provided by correlating the rates of input of air and fuel to the burners. To supply enough gas to effect the desired temperature and support under normal conditions, an excess of air over that required for the combustion of the fuel gas is used. The supply of gas may be varied to change the heat input, and the supply of both air and gas may be varied to change the pressure in the plenum. Hot fluid from the plenum 44 escapes through the pores of porous plate 50 to provide a supporting pressure for the glass plate G, in a manner which will later be explained in more detail. A plurality of vents 72 project through the roof of the processing section 12 to exhaust the interior to the atmosphere.

At the lower side of the units 40, opposite the apertures 66 thereof, a series of uniform disc-like driving members 90 extend inwardly and just above the porous plates 50 to frictionally engage one edge only of the glass sheets supported above the plates on a film of gas and convey them along the bed in continuous straight line travel. Drive members 90 (FIGS. 2 and 4) are mounted on shafts 92, journaled for rotation in bearings 94. Each shaft 92 is geared to drive shaft 96 extending longitudinally of the support bed and driven through chain 98 by electric motor 100 in a manner well known in the art.

Next adjacent the gaseous support heating section 12 in the direction of travel of the workpiece is quenching section 13. As shown in FIGS. 1 and 2, the quenching section includes a lower air support bed 110 of the same construction as support units 40 of the heating section. An upper cooling box 112, the same as bed 110, but inverted, is supported above and in vertical alignment with the lower support bed 110 in such fashion as to be capable of being raised and lowered. Relatively cool gas, such as air at ambient temperature, is supplied to upper and lower plenum chambers via blower 114 and ducts 116 and 117. The air is supplied at a suitable rate of flow and pressure to support the glass sheets between the opposing film of cool air and to rapidly cool the glass. Rotating drive discs 120 along the lower side of the quench section extend between the upper and lower porous plates to frictionally engage one edge only of the workpiece and convey it along the bed in continuous straight line travel in the manner previously described in connection with the heating section.

As shown in FIGS. 1 and 2, the delivery section 14 consists of conveyor rolls 200 provided with guide collars 220 in alignment with discs 90 of the processing section to maintain the proper position of the glass during transfer therefrom. Each roll is journaled in bearings supported on channels 170 and is driven by a sprocket 230 through chains 240 and 250 by motor 260.

In accordance with the above described embodiment of this invention, highly developed and refined supporting apparatus have been provided to prevent the distortion of glass at deformation temperature, an important achievement not accomplished by known conveying apparatus and processes, including known air film support devices. Specifically, it is important to have a very large proportion of the glass sheet or plate supported by a uniform force. This prohibits flowing the supporting air film across substantial areas of a supporting plate (i.e., between such a plate and the supported glass) because of the creation thereby of a progressive pressure drop along the path of flow and, hence, a nonuniform supporting force. Furthermore, air introduced from a plurality of points beneath the supported glass must be exhausted beneath the supported area rather than merely by lateral flow to the glass edges to prevent a pressure build-up centrally of the supported sheet that will cause a doming effect upon the soft glass. It is further necessary that the support be provided by a diffused and relatively small gas flow to provide substantially uniform pressure across the width of the supporting bed, thereby avoiding deformation, such as dimpling, due to the direct impingement of high pressure localized jets of gas against the supported glass surface. It is also desirable to provide a substantial pressure drop between a uniform source of gas under pressure and the pressure exerted beneath the glass by the gas film. This not only helps to maintain a uniform plane of support but, in addition, the pressure drop prevents a substantial loss of plenum pressure by the escape of gas through portions of the porous platen which are not covered by glass.

As shown schematically in FIG. 5, a substantially uniform pressure is exerted within the plenum chamber 44 beneath the porous plate 50. This gas flows through the many pores randomly located throughout the entire area of plate 50 to the zone immediately above the porous plate and below the supported glass sheet G. Because of the small size of the pores (the average distance across the pores being preferably between about .0002 and .025 inch and the void content of the material being about 50 percent), the flow of gas is restricted and the pressure is reduced by a factor of at least about 1.5 and preferably of above 5. A proper correlation between the reduction in flow and pressure caused by the porosity of plate 50 and the pressure within plenum 44 must be maintained to provide adequate pressure to support the weight of the glass sheet. An excess pressure over that required to support the weight of the glass sheet elevates the sheet from the upper surface of the porous plate until the pressure and weight per unit area balance. In operation, the rate of flow of gas from the reservoir through the porous plate to the zone beneath the supported glass is maintained at such a level that the average clearance between the reference surface of the porous plate and the glass sheet being supported is not less than 0.001 inch and ordinarily not greater than 0.050 inch.

The flow of gas emitted through the pores of plate 50 moves laterally beneath the glass plate G to the nearest zone of lower pressure provided by the upper openings of tubes 56 flush with the surface of plate 50. Because these tubes communicate at the lower openings thereof directly with the surrounding atmosphere, the gas beneath the glass sheets exhausts through the tubes rather than laterally to the margins of the glass sheet. For adequate exhaust, it has been found that the openings of tubes 56 in the plate 50 underlying a supported glass sheet should constitute at least about 5 percent of the covered plate area. However, to assure sufficient support area, the tube openings should preferably constitute not more than about 30 percent of the covered plate area, and in any event not more than 50 percent. The diameter of the tubes 56 may vary from as small as 0.050 inch to as large as one inch or greater, depending upon the number used, the area of the support zone and the length of the tubes. Of course, the tubes need not be of a constant diameter and all tubes need not be of the same diameter.

Tubes 56 extend through the porous plates 50 to the upper surface thereof to prevent any flow of gas through porous passageways interior of the plate (i.e., within the thickness thereof) to an exhaust zone. Such a short circuiting of the flow, as might happen if the tubes merely abutted the bottom surface of the plate in communication with exhaust holes therethrough, would result in undesired pressure variations above the plate.

As shown by the pressure profile of FIG. 5, a substantially uniform general pressure is provided over the supply portions of the porous plate with a sharp drop in pressure above each exhaust orifice. Because a low gas flow rate is sufficient to provide the necessary support pressure, the areas necessary for adequate exhaust are small with respect to the support area. The flow rate through the exhaust channels is accordingly greater than in the support zone. With this construction, a substantially uniform average support pressure is achieved which shows none of the doming characteristic of the pressure profiles of prior art film supports. Doming is caused by a progressive pressure drop beneath the supported sheet from the central portion to the edges and occurs when the flow of gas to the area beneath the supported sheet must move to the edges of the sheet to escape. This is an unacceptable characteristic in apparatus to be used to support deformable sheet material, such as glass at an elevated temperature because the sheet deforms to the general pressure profile.

As shown in FIG. 2, adjacent rows of exhaust tubes 56 are offset to substantially prevent any one portion of glass sheet traversing the supporting units 40 from coming in repeated contact with exhaust zones to a greater extent than other portions of the sheet. Thus, pressure and temperature variations are averaged over the entire area of each glass sheet.

The pressure profile across the surface of the porous plate is determined in the following manner: A pressure sensing plate having a small hole therethrough is positioned above the porous plate and spaced from the upper surface thereof a distance corresponding to the height of the supported sheet, e.g., 0.010 inch. A pressure transducer is connected to the sensing hole, and the electrical output of the pressure transducer is connected to a recorder which will plot pressure variations on one axis versus displacement of the pressure sensing plate on the other axis. The pressure transducer controls the displacement of the recording device along, e.g., the Y-axis of a graph. A potentiometer, the shaft of which is rotated by relative horizontal movement between the sensing plate and the porous plate, translates such movement to an electrical signal which controls the displacement of the recording device along the other or X-axis of the graph.

In the operation of the above-described embodiment, sheets of glass are placed seriatim upon rolls 20 of the apron roll unit 15 with a longitudinally extending edge abutting guide collars 23 and are conveyed by the rotation of rolls 20 through the preheat section 11 where they are heated from ambient temperature to a temperature just below that at which they will deform to the contour of the supporting force. At the end of the preheat section the glass sheets are conveyed onto the gas support units 40 of the heating section 12. The glass sheets abut the peripheries of disc driving members 90 which frictionally engage a longitudinally extending edge of the glass sheet. Frictional engagement is assured by virtue of the angular disposition of units 40 transversely of the predetermined path of travel. Hot products of combustion introduced into the plenum chambers 44 of units 40 provide fluid support as well as heat to the lower surface of the glass sheets, and heating coil units 34 supply heat above the glass sheets to balance that supplied by the supporting gas below to prevent heat warpage and an accompanying loss in uniform support. The temperature of the hot products is normally maintained constant and slightly above the desired final temperature of the glass. To heat glass for the tempering process, the gas temperature is generally maintained at approximately 1200 degrees Fahrenheit.

In the quenching section air at ambient temperature is supplied to upper and lower plenum chambers of the upper cooling box 112 and the lower air support bed 110 and impinged upon both major surfaces of the glass sheets to uniformly temper the glass while it is suspended between the opposing flows. Drive discs 120 convey the glass by edge contact. The uniformity of heat transfer assured by the uniform diffused flow of gas through the porous plates of the heating and quenching sections minimizes the formation of an iridescent stress pattern in the tempered glass. After the glass is cooled to approximately 600 degrees Fahrenheit in the quenching section it is conveyed from the air support to the rolls of the delivery system and thence to their next destination.

It has been found that a plenum pressure of 4.9 ounces per square inch and a gas flow rate of 180 standard cubic feet per minute per square foot of plate area, when used with a porous plate that reduces the pressure of the gas flowing therethrough by a factor of 14 and that has exhaust passages 0.060 inch in diameter underlying approximately 13 percent of the supported glass area, is sufficient to support a sheet of soda-lime-silica window or plate glass a distance of approxmately 0.017 inch above the upper surface of the porous plate.

Figure 6:
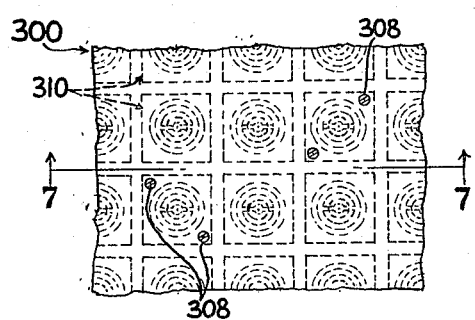
FIG. 6 is a partial plan view of another embodiment of a support unit, including a diagrammatic graph.
Figure 7:
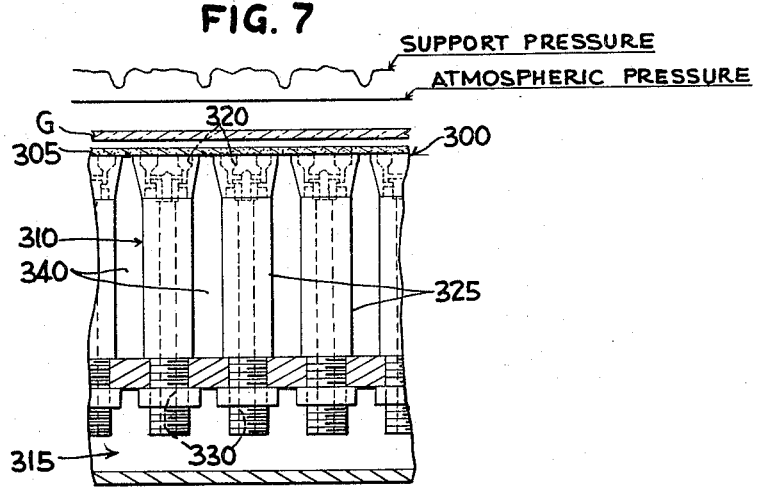
FIG. 7 is a detailed view, partly in section, taken along the line 7—7 of FIG. 6.

Another embodiment of a gaseous support unit constructed in accordance with this invention is shown in FIGS. 6 and 7 of the drawings. A flat, porous support bed 300 formed of a porous stainless steel plate 305 or other heat resistant foraminous material is supported on and fastened, or by machine screws 308, to a modular arrangement of gas outlet members 310, hereinafter referred to as modules 310. Each module has an open-topped chamber 320 at its upper or outer cud, when arranged as shown in FIG. 7. A stem portion 325 having an internal passageway 330 supports each module upon a plenum chamber 315 common to a group of modules. Each passageway 330 connects a plurality of discharge orifices 335 opening into each chamber 320 with plenum chamber 315. Gas under pressure is supplied to plenum chamber 315 in the same manner as described in connection with plenum chamber 44. Orifices 335 restrict the flow of gas from the plenum chamber to module chambers 320 and direct the flow to the sides of the chambers to diffuse the gas and prevent direct impingement of jets of gas against the porous plate 305. The flow of gas is further diffused as it passes from chambers 320 through porous plate 305.

When a sheet of glass or other material is supported above the porous plate 305 upon a continuous flow of gas emitted from modules 310, the flow is exhausted downwardly from beneath the glass sheet through the porous plate 305 between adjacent modules to exhaust zones 340 of lower pressure. Gas in exhaust zones 340 flows laterally of the support bed beneath the modules and porous plate to the sides of the bed. The resultant pressure profile is shown diagrammatically in FIG. 7. Where more adequate exhaust is necessary or desired, the porous plate 305 may be provided with enlarged openings or unrestricted passageways therethrough above exhaust zones 340.

While in the foregoing description illustrative embodiments of this invention have been disclosed, in many instances it is possible to alter the constituents or substitute equivalents therefor to obtain substantially the same results in substantially the same way.

For example, the porous plate may be made of a refractory material instead of porous stainless steel. Thus, a granular silicon carbide or finely divided alumina grog with a binder may be formed into a suitable plate having small passageways or pores between the particles. The desired flow and pressure drop of the gas through the porous plate may be controlled by the particle size of the alumina or silicon carbide to provide the support characteristics desired.

It will be readily apparent that the exhaust conduits, such as the tubes 56 disclosed, need not communicate to the surrounding atmosphere through the bottom of the plenum chamber but may follow other paths as long as they provide an exhaust conduit between the pressure zone immediately beneath the supported glass sheet and the ambient atmosphere. The size and number of the exhaust conduits necessary to provide adequate exhaust will vary with the flow requirements for supporting any particular weight of glass at a predetermined height above the upper surface of the plate, the only requirement for satisfactory support being sufficient exhaust capacity to prevent a pressure build-up centrally of the supported area of the glass sheet, thereby causing a deformation of the glass corresponding to the support pressure variation across the area thereof.

The disclosed apparatus for providing a fluid support for a sheet of glass may be used with other fluids than hot products of combustion or ambient air, for example molten salts. It may also be used for other than heating or cooling a support glass sheet, as, for example, for supporting and conveying a glass sheet already heated. It may also be used for conveying and heating other objects, provided one surface is reasonably plane. Where a hot ribbon is to be processed upon the support bed disclosed herein the ribbon may be formed by rolls or by extrusion, or, alternatively, may be directly cast upon and formed from another source on the support bed.

Where desired, the porous surface need not be planar, but rather may be curved, either in its entirety for conveying curved sheets or progressively, as from flat to curved, for bending flat sheets as they travel along the support bed at a deformation temperature.

It should be evident from the above that, while in the foregoing disclosure certain preferred embodiments of the invention have been disclosed, numerous modifications or alterations may be made therein without departing from the spirit and scope of the invention as set forth in the appended claims.

I claim:

1. In apparatus for conveying a glass sheet upon a gas support, a porous bed providing a path along which the glass sheet may move, said bed having a plurality of small pores which provide a plurality of paths through the porous bed, means to supply hot gas to the under side of said bed under a pressure sufficient to force the hot gas through the porous bed and to provide a gas support for glass sheet disposed over the bed, means to heat the gas so supplied, and passageways large with respect to the pores extending through said bed and communicating between the area immediately above the bed and an exhaust area, said passageways being disposed in central areas of the path, said passageways being enclosed by the porous bed and spaced from other such passageways both in the direction of the path and in a direction transversely of the path.

2. The apparatus of claim 1 wherein the size of the pores is up to 0.025 inch.

3. The apparatus of claim 1 wherein said passageways provide means to obstruct flow of gas into the passageways below the top of the plate.

4. The apparatus of claim 1 wherein the area overlying the passageways is 5 to 30 percent of the area of the path under which glass is supported.

5. In a method of conveying hot glass at a deformation temperature upon a gas support, the improvement which comprises heating a gas to a temperature sufficient to maintain said glass at its deformation temperature, flowing said heated gas through the pores of a porous bed to the upper surface thereof, defining a path of movement for the glass, disposing glass on said path, feeding the gas through the porous bed under pressure sufficient to support the glass disposed over the path, said glass being at a glass deformation temperature, and exhausting the gas downwardly from the upper surface of the bed and beneath the glass sheet through a plurality of spaced, centrally located zones which are enclosed by the bed and which are spaced from other such zones both in the direction of the path and in a direction transversely thereof, and moving the glass over the path.

6. The process of claim 5 wherein said exhaust zones are offset from adjacent passageways in the line of travel of the glass.

References Cited by the Examiner
UNITED STATES PATENTS

| | | | |
|---|---|---|---|
| 1,622,817 | 3/1927 | Waldron | 65—182 X |
| 1,821,375 | 9/1931 | Brancart | 65—25 |
| 2,395,727 | 2/1946 | Devol | 65—374 X |
| 2,826,868 | 3/1958 | Wynne et al. | 65—194 X |

DONALL H. SYLVESTER, *Primary Examiner.*

A. D. KELLOGG, *Assistant Examiner.*